April 22, 1969 P. A. MORRISSETTE 3,439,880

MAGNETIC TAPE CARTRIDGE AND DRIVE MECHANISM

Filed April 5, 1967

INVENTOR:
PHILIP A. MORRISSETTE,

BY William S Wolfe
HIS ATTORNEY.

United States Patent Office 3,439,880

Patented Apr. 22, 1969

3,439,880

MAGNETIC TAPE CARTRIDGE AND DRIVE MECHANISM

Philip A. Morrissette, New Hartford, N.Y., assignor to General Electric Company, a corporation of New York

Filed Apr. 5, 1967, Ser. No. 628,694
Int. Cl. G11b *15/32*
U.S. Cl. 242—55.13 6 Claims

ABSTRACT OF THE DISCLOSURE

A magnetic tape cartridge including a casing and a shaft journaled therein. The cartridge is of the reel-on-reel type, that is, a pair of reels including central hub portions are coaxially mounted in superposed relation about the shaft. A rim-driven disc including a central aperture is interposed between the reels. Protruding cams on the disc extend inwardly into the aperture and are received by a helical cam groove in a drive clutch mounted about the shaft in a space defined by the reel hubs. When the disc is driven, the protruding cams act in the groove of the drive clutch and cause the drive clutch to travel upwardly or downwardly on the shaft, depending on the direction of rotation of the disc to thereby drivingly engage one of the reels so that the reels may be driven in a forward or reverse direction.

BACKGROUND OF INVENTION

This invention relates to an improved magnetic tape cartridge of the reel-on-reel type having a simplified tape driving mechanism.

Current magnetic tape cartridges include casings which must be sufficiently large to accommodate a pair of tape reels and the mechanical linkage arrangements which drivingly couple an external drive motor to the reels. Cartridges of the reel-on-reel type, that is, a pair of tape reels coaxially mounted in superposed relation about a common shaft, have substantially reduced the casing size required but the complex mechanical linkage arrangements of the prior art continue to increase the overall size, as well as the expense, of such tape cartridges.

SUMMARY OF INVENTION

It is, therefore, an object of this invention to provide a simplified mechanical linkage arrangement for a magnetic tape cartridge.

It is a further object of the present invention to produce a tape cartridge which is more compact than comparable devices in the prior art.

In accordance with my invention in one form thereof, I provide a magnetic tape cartridge of the reel-on-reel type wherein a rim-driven disc is interposed between the reels. The disc includes a central aperture and cammingly engages a drive clutch positioned in the aperture. When the disc is driven by a drive motor, the clutch is displaced vertically by the camming action of the driven disc and into driving engagement with one of the reels, depending on the direction of rotation of the driven disc. The mechanical linkage or drive mechanism so produced has been found to be entirely satisfactory while being much more simplified than comparable devices found in the prior art. Moreover, the position of the driven disc and the optimum placement of the drive clutch within the space defined by the reel hubs yields a particularly compact tape cartridge.

DETAILED DESCRIPTION

Other objects and advantages of my invention may better be understood by reference to the following description when taken in conjunction with the accompanying drawings in which.

Figure 1:
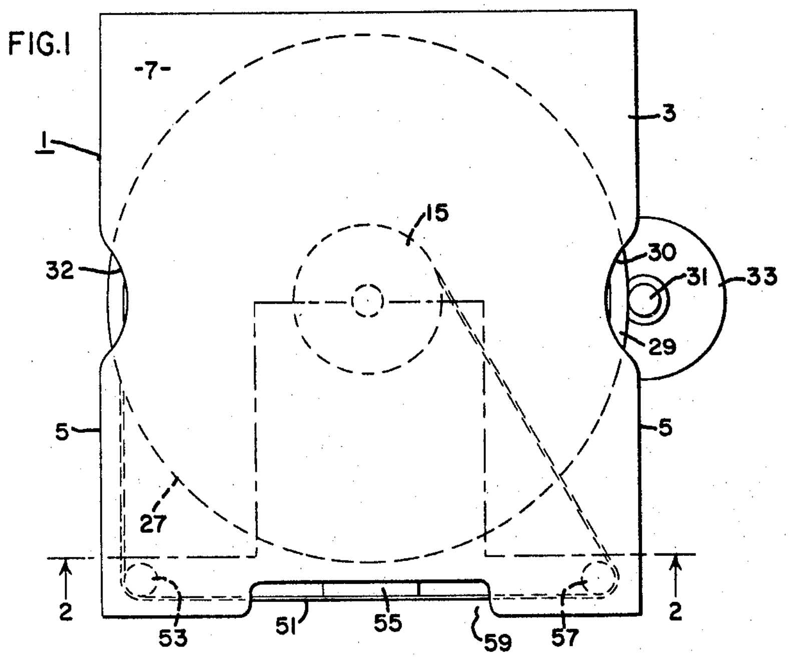
FIGURE 1 is a top view of the tape cartridge of the present invention.
Figures 2, 3, 4, 6:
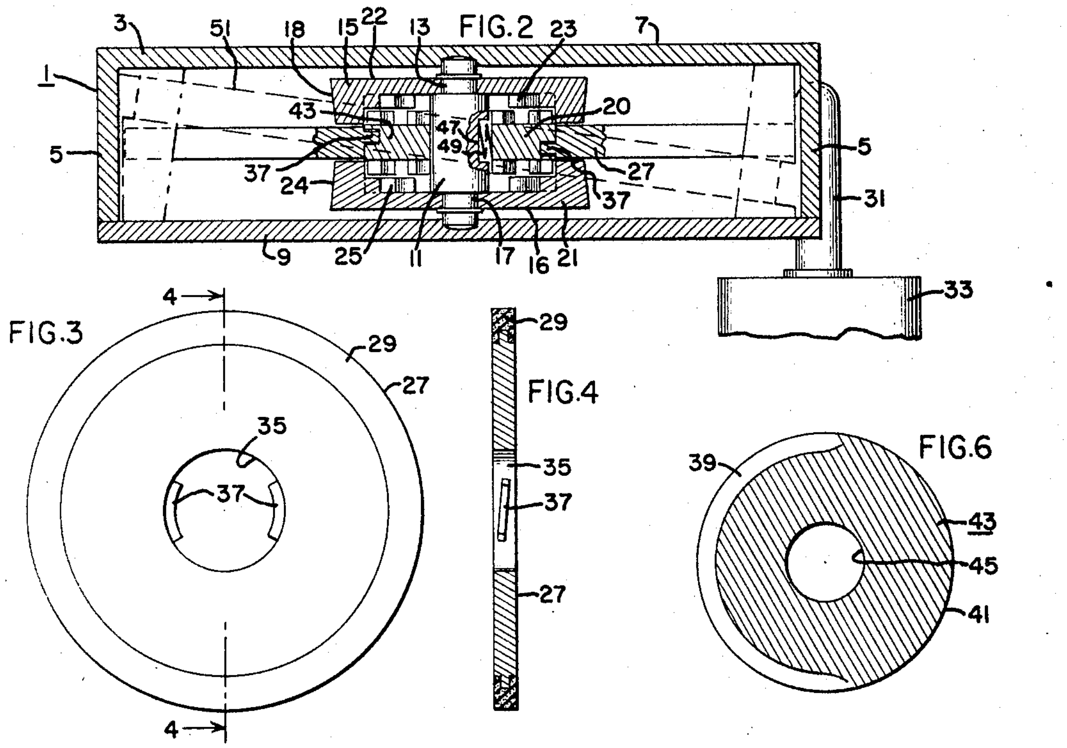
FIGURE 2 is a sectional view of the tape cartridge taken along line 2—2 in FIGURE 1 showing the novel drive mechanism.
FIGURE 3 is a top view of the driven disc of the present invention.
FIGURE 4 is a sectional view of the driven disc taken along line 4—4 of FIGURE 3.
FIGURE 6 is a sectional view of the drive clutch taken along line 6—6 in FIGURE 5.

Referring now to the drawings, and FIGURES 1 and 2 in particular, there is shown a magnetic recording tape cartridge 1 of the reel-on-reel type. The portable cartridge is removable and is combined with a recording and a reproducing apparatus (not shown) for receiving it. The recording and reproducing apparatus may be of conventional design and operation and forms no part of the present invention.

The magnetic tape cartridge of the present invention includes a housing 3 having side walls 5, a top wall 7 and a bottom wall 9 which form a space therein. A central shaft 11 is mounted in the housing 3 for free rotation, the ends of the shaft 11 being freely journaled in bearings in the top and bottom walls 7 and 9, respectively, in a conventional manner. The shaft 11 includes a reduced diameter section 13 adjacent the top wall 7 about which a reel hub 15 is freely journaled.

The shaft 11 includes a second reduced diameter section 17 adjacent the bottom wall 9 of the housing 3 and a second reel hub 21 is freely journaled thereabout. The hubs 15 and 21 comprise flat discs 16 and 22 from which extend integral annular rim portions 18 and 24, respectively. It can be seen, then, that the reel hubs 15 and 21 are mounted on the shaft 11 in superposed relationship and that the hubs define a space 20 therebetween about the shaft 11. The reel hubs 15 and 21 include annular internal gear surfaces 23 and 25 on the interior surfaces of the discs 16 and 22, respectively, through which the hubs 15 and 21 may be driven.

A driven disc 27 is interposed between the reel hubs 15 and 21. As can be seen in FIGURES 3 and 4, the driven disc 27 includes an annular rim 29 of a soft material, such as rubber. The housing 3 includes openings 30 and 32 in opposed side walls 5 thereof which expose portions of the rim 29 of the driven disc 27 as shown in FIGURE 1. The annular rim 29 is drivingly engaged by a shaft 31 of a suitable drive motor 33 mounted in the recording apparatus in a conventional manner.

Figure 5:
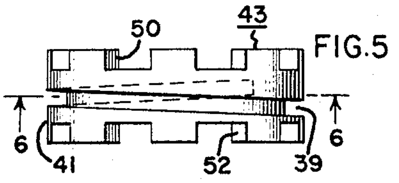
FIGURE 5 is a side view of the novel drive clutch of the present invention.

The disc 27 includes a central aperture 35 through which the shaft 11 extends, and a pair of protruding cam portions 37, angled slightly to the horizontal, which extend into the aperture 35. The protruding cam portions 37 on the disc 27 are vertically offset one with the other as shown in FIGURE 2 and are adapted to be received in opposing portions of a helical cam groove 39 formed in the annnular rim 41 of a drive clutch 43, best seen in FIGURES 5 and 6, which is displaced vertically when the driven disc 27 is rotated. The disc-like drive clutch 43 includes a central aperture 45 through which the shaft 11 extends. The shaft 11 includes a longitudinal slot 47, as shown most clearly in FIGURE 2, for reception of a spring device 49 to provide a slip clutch action, the spring exerting an outward force against the drive clutch 43 so that relative rotation between the shaft 11 and the drive clutch 43 is eliminated while relative axial movement is permitted. The drive clutch 43 includes annular gear surfaces 50 and 52 on each face thereof which are adapted to drivingly engage the annular internal gear surfaces 23 and 25 of the reel hubs 15 and 21, respectively, upon vertical displacement of the drive clutch 43. Once the respective gear surfaces engage, the drive clutch 43 slips on the shaft 11 due to the action of spring device 49, the driven disc 27 and clutch 43 thereafter rotating in unison.

According to the present invention, as shown in FIGURES 1 and 2, a length of tape 51 is wound about the lower reel hub 21, for example, and the free end of the tape 51 is threaded through a tape path defined by a first guide member 53, a pressure pad 55, and a second guide member 57 for engagement with the other reel hub 15. The cartridge housing 3 includes an opening 59 at the location of the pressure pad 55 so that a suitable reproducing and recording pad (not shown) of conventional variety, and carried within the recording apparatus, may be caused to engage the tape 51 as it travels past the pressure pad. To initiate a recording or playback operation, the tape cartridge 1 is inserted into the recording apparatus whereupon the just-mentioned recording head engages the tape at the open portion 59 of the housing, and the shaft 31 of the drive motor 33 engages the rim portion 29 of the driven disc 2 at opening 30. Actuation of the drive motor 33 results in the disc 27 being driven so that the angled cams 37 resting in the helical cam groove 39 in the drive clutch 43 are caused to rotate and thereby to displace the drive clutch 43 vertically upward until the gear surfaces 50 of the drive clutch 43 drivingly engages the internal gear surface 23 of the hub portion 15. Continued operation of the motor during recording or playback results in the driven disc 27, the drive clutch 43, the shaft 11, and the reel hub 15 being rotated as a unit.

When the recording or playback operation has terminated, the tape 51 may be rewound around the first reel hub 21 in one of two manners. Firstly, the motor 33 can be reversed through appropriate switching, whereupon the drive disc 27 is rotated in an opposite direction, thereby causing the rotating cams 37 in the drive clutch groove 39 to displace the drive clutch 43 until the lower gear surface 52 thereof drivingly engages the internal gear surface 25 of the lower reel hub 21. Continued operation of the motor results in rotation of the driven disc 27, the drive clutch 43, the shaft 11, and the lower reel hub 21 as a unit until the tape 51 is rewound. Secondly, the tape 51 may also be rewound by first removing the tape cartridge 1 from the recording device and inverting or "flipping over" the tape cartridge 1 and reinserting it into the recording device. The motor shaft 33 then engages the rim portion 29 of the driven disc at the other opening 32 in the housing 3. Operation of the motor 33 without reversing, results in rotation of the driven disc 27 so that the protruding cams 37 in the drive clutch groove 39 force the drive clutch 43 upwardly until the gear surface 52 thereon drivingly engages the internal gear surface 25 of the reel hub 21 whereupon continued operation of the drive motor allows the tape 51 to be rewound, as previously described.

I have thus described a novel drive mechanism for a reel-on-reel type tape cartridge wherein a driven disc having protruding cam portions positioned in a cam groove in a drive clutch causes the clutch to be vertically displaced alternately to drivingly engage a pair of tape reel hubs. It can now be understood that an important aspect of the present invention is that the driven disc includes certain portions which will cammingly engage a drive clutch so that rotation of the driven disc will both vertically displace the drive clutch and allow the disc and the drive clutch to rotate as a unit when the vertical displacement of the drive clutch is terminated.

While the invention has been described with specificity, it is the aim of the appended claims to cover all such equivalent variations as come within the true spirit and scope of the foregoing disclosure.

What I claim as new and desire to secure by Letters Patent of the United States of America is:

1. A cartridge for recording tape comprising:
(a) a housing;
(b) a shaft freely journaled in said housing;
(c) a pair of reel hubs freely journaled in superposed relation about said shaft;
(d) a rotatable driven disc interposed between said reel hubs and having a central aperture through which said shaft extends;
(e) a drive clutch freely journaled about said shaft and engaged by said driven disc for selectively coupling said reel hubs with said driven disc;
(f) said driven disc, then rotated, vertically displacing said drive clutch into driving engagement with a selected one of said reel hubs, depending on the direction of rotation of said driven disc, so that the recording tape may be wound and rewound about said reel hubs; and
(g) said driven disc including protruding cam portions extending into said central space and said drive clutch including a helical cam groove for receiving said protruding cam portions whereby said drive clutch, upon rotation of said driven disc, is vertically displaced by the force exerted thereon by said cam portions in said cam groove.

2. A cartridge for recording tape comprising:
(a) a housing;
(b) a shaft freely journaled in said housing;
(c) a pair of reel hubs freely journaled in superposed relation about said shaft;
(d) a rotatable driven disc interposed between said reel hubs and having a central aperture through which said shaft extends;
(e) a drive clutch freely journaled about said shaft and engaged by said driven disc for selectivley coupling said reel hubs with said driven disc;
(f) said driven disc, when rotated, vertically displacing said drive clutch into driving engagement with a selected one of said reel hubs, depending on the direction of rotation of said driven disc, so that the recording tape may be wound and rewound about said reel hubs; and
(g) said reel hubs including annular gear surfaces thereon and said drive clutch comprising a cylindrical disc member having a pair of opposed faces including annular gear surfaces thereon engagable with said gear surfaces on said reel hubs, the engagement of the gear surface on a selected reel hub by one of the gear surfaces on said drive clutch terminating the vertical displacement of said driven disc, whereupon said driven disc drives said selected reel hub.

3. A cartridge for recording tape comprising:
(a) a housing;
(b) a shaft freely journaled in said housing;
(c) a pair of reel hubs freely journaled in superposed relation about said shaft;
(d) a rotatable driven disc interposed between said reel hubs and having a central aperture through which said shaft extends;
(e) a drive clutch freely journaled about said shaft and engaged by said driven disc for selectively coupling said reel hubs with said driven disc;
(f) said driven disc, when rotated, vertically displacing said drive clutch into driving engagement with a selected one of said reel hubs, depending on the direction of rotation of said driven disc, so that the recording tape may be wound and rewound about said reel hubs; and
(g) said housing including a pair of spaced openings and guide means in said housing defining a tape path past said openings, the first of said openings being adapted to receive a recording head for engagement with said tape, and the second of said openings exposing a first rim portion of said drive disc for driving engagement by a drive shaft.

4. The tape cartridge as recited in claim 3 wherein said housing includes a third opening opposite said second opening exposing a second rim portion of said driven disc, whereby said cartridge may be inverted and said second rim portion of said driven disc may be engaged by said drive shaft so that the rotation of said driven disc, said drive clutch and said reel hubs may be reversed without reversing the rotation of said drive shaft.

5. In combination with a sound recording apparatus including a drive shaft and a recording head, a cartridge for recording tape comprising:

(a) a housing;
(b) a shaft freely journaled in said housing;
(c) a pair of reel hubs freely journaled in superposed relation about said shaft;
(d) a rotatable driven disc interposed between said reel hubs and having a central aperture through which said shaft extends;
(e) a drive clutch freely journaled about said shaft and engaged by said driven disc for selectively coupling said reel hubs with said driven disc;
(f) said driven disc, when rotated, vertically displacing said drive clutch into driving engagement with a selected one of said reel hubs, depending on the direction of rotation of said driven disc, so that the recording tape may be wound and rewound about said reel hubs; and
(g) said housing being further defined by a pair of spaced openings and guide means in said housing defining a tape path past said openings the first of said openings being adapted to receive said recording head for engagement with said tape, and the second of said openings exposing a first portion of said drive disc for driving engagement by said shaft.

6. The tape cartridge as recited in claim 5 wherein said housing includes a third opening opposite said second opening exposing a second rim portion of said driven disc, whereby said cartridge may be inverted and said second rim portion of said driven disc may be engaged by said drive shaft so that the rotation of said driven disc, said drive clutch and said reel hubs may be reversed without reversing the rotation of said drive shaft.

References Cited

UNITED STATES PATENTS 1,310,211 7/1919 Philpot ----------- 242—55.12

LEONARD D. CHRISTIAN, *Primary Examiner.*